United States Patent
Struble et al.

(12) 
(10) Patent No.: US 7,153,127 B2
(45) Date of Patent: Dec. 26, 2006

(54) METHOD AND APPARATUS FOR BLOW MOLDING HOLLOW PLASTIC CONTAINERS

(75) Inventors: Douglas S. Struble, Maumee, OH (US); John W. Safian, Maumee, OH (US)

(73) Assignee: Graham Packaging Plastic Products Inc., York, PA (US)

( * ) Notice: Subject to any disclaimer, the term of this patent is extended or adjusted under 35 U.S.C. 154(b) by 186 days.

(21) Appl. No.: 10/439,061

(22) Filed: May 15, 2003

(65) Prior Publication Data

US 2006/0073233 A1    Apr. 6, 2006

(51) Int. Cl.
*B29C 49/54* (2006.01)
*B29C 49/60* (2006.01)
*B29C 49/04* (2006.01)

(52) U.S. Cl. .................. 425/525; 425/532; 425/536; 425/538; 425/540

(58) Field of Classification Search ................ 425/525, 425/532, 538, 540, 536; 264/527, 540, 542, 264/543; B29C 49/54
See application file for complete search history.

(56) References Cited

U.S. PATENT DOCUMENTS

| | | | |
|---|---|---|---|
| 2,515,093 A | | 7/1950 | Mills |
| 2,579,390 A | | 12/1951 | Mills |
| 3,004,285 A | * | 10/1961 | Hagen ......................... 264/527 |
| 3,339,232 A | * | 9/1967 | Battenfeld et al. ........... 425/535 |
| 3,342,916 A | * | 9/1967 | Peters ......................... 425/525 |
| 3,440,996 A | * | 4/1969 | Crocella et al. ............. 264/540 |
| 3,672,799 A | * | 6/1972 | Liebertz et al. ............. 264/540 |
| 3,792,143 A | * | 2/1974 | Branscum et al. .......... 264/523 |
| 3,915,611 A | | 10/1975 | Peters |
| 3,973,896 A | * | 8/1976 | Peters ......................... 264/540 |
| 4,025,276 A | * | 5/1977 | Peters ......................... 425/536 |
| 4,035,461 A | * | 7/1977 | Korth .......................... 425/536 |
| 4,120,927 A | * | 10/1978 | Nielsen ....................... 425/525 |
| 4,510,116 A | * | 4/1985 | Peters et al. ................ 425/525 |
| 4,523,904 A | | 6/1985 | Martin |
| 4,549,865 A | | 10/1985 | Myers |
| 4,648,831 A | | 3/1987 | Johnson |
| 4,799,876 A | | 1/1989 | Peters |
| 4,989,757 A | | 2/1991 | Krall |
| 5,071,037 A | | 12/1991 | Moore et al. |
| 5,078,948 A | | 1/1992 | Troutman et al. |

(Continued)

FOREIGN PATENT DOCUMENTS

JP    2002192607 A  *  7/2002

*Primary Examiner*—Robert B. Davis
(74) *Attorney, Agent, or Firm*—Venable LLP; James R. Burdett; Stuart I. Smith (57) ABSTRACT

A mold system for blow molding hollow plastic containers includes an extruder for providing a hollow tube of plastic material having a longitudinal axis. Three mold segments include at least two mold segments that are movable against the third mold segment, in directions perpendicular to the tube axis, between a closed position in which the mold segments form a hollow mold cavity in which the tube is captured and an open position spaced from the tube axis. A blow pin is disposed on one of the mold segments to pierce the tube in the closed position of the mold segments. One of the mold segments may be a mold core movably mounted on a second of the mold segments, and cylinders are mounted on the second mold segment for moving the mold core between an extended position and a retracted position with respect to the second mold segment. The blow pin may be movably mounted on the mold core.

14 Claims, 12 Drawing Sheets

U.S. PATENT DOCUMENTS

| | | |
|---|---|---|
| 5,114,659 A | 5/1992 | Krall |
| 5,207,356 A | 5/1993 | Krall |
| 5,249,786 A | 10/1993 | Ross |
| 5,429,789 A | 7/1995 | Krall |
| 5,551,860 A | 9/1996 | Budzynski et al. |
| 5,556,648 A | 9/1996 | Budzynski et al. |
| 5,645,870 A | 7/1997 | Larsen |
| 5,759,475 A | 6/1998 | Takakusaki et al. |
| 5,851,479 A | 12/1998 | McGlynn et al. |
| 5,863,489 A | 1/1999 | Flood et al. |
| 5,939,014 A | 8/1999 | Anderson et al. |
| 5,939,108 A | 8/1999 | Nobuyuki et al. |
| 6,123,231 A | 9/2000 | Geisinger |
| 6,143,235 A * | 11/2000 | Birkert ........................ 264/529 |

* cited by examiner

METHOD AND APPARATUS FOR BLOW
MOLDING HOLLOW PLASTIC
CONTAINERS

The present invention is directed to manufacture of hollow plastic containers, and more particularly to a method and apparatus for blow molding hollow plastic containers having improved versatility in terms of the geometries, features and contours of the containers that can be molded.

BACKGROUND AND SUMMARY OF THE INVENTION

Hollow plastic containers are conventionally fabricated by blowing the containers to the internal confines of a mold cavity formed by a pair of opposed mold segments. The containers must be designed so that they can be removed from the mold after blowing. This requires that any undercuts must be shallow enough to permit the container to be stripped from the mold when the mold is opened. This limits the push-up height that can be achieved, and requires that the cross section of the container have a positive draft toward the mold parting line. A general object of the present invention is to provide a method and apparatus for molding hollow plastic containers having improved versatility in terms of the geometries, features and contours of the containers that can be molded.

A presently preferred but exemplary implementation of the invention deals with fabrication of self-draining containers, most preferably in a continuous extrusion wheel-type manufacturing process. Self-draining containers of this exemplary type are conventionally employed for packaging laundry products, and are illustrated for example in U.S. Pat. Nos. 4,989,757, 5,114,659, 5,207,356, 5,429,786 and 6,123,231. In general such containers include a hollow body, and an outlet portion with a pour spout, a collar surrounding the pour spout and having internal threads for securing a closure, a channel between the collar and the spout with an angulated bottom surface to capture any liquid that drips from the spout, and an opening at the low point of the angulated surface for draining the liquid back into the container. Current wheel-type manufacturing processes for containers of this type are not well suited for molding the drainback system as one piece integral with the container body and possessing high-definition internal threads. Continuous extrusion wheel-type processes for fabricating containers are illustrated, for example, in U.S. Pat. Nos. 4,523,904, 4,549,865, 4,648,831, 5,645,870 and 5,939,014. In processes of this type, an extruder provides a continuous hollow tube of plastic material. A plurality of molds are mounted around the periphery of a wheel, and the extruded tube is oriented tangentially of the wheel at a position aligned with the mold pairs as they pass in sequence. In general, portions of the tube are captured between opposed mold segments of each pair in sequence and blow molded to form containers. The central axis of each mold cavity in sequence is aligned with the extruded tube.

In a method of molding a hollow plastic container in accordance with preferred embodiments of the present invention, at least three mold segments are closed around a hollow tube of plastic material having a longitudinal axis by moving at least two of the mold segments toward the third mold segment in directions that are non-parallel to the axis of the tube. The mold segments when closed form a mold cavity that surrounds and captures a portion of the tube. A blow needle or pin on one of the mold segments pierces the tube when the mold segments are closed around the tube, and the tube is blown through the blow pin to the internal confines of the mold cavity. The mold cavity is then opened and the blown container is removed from the mold.

In the preferred but exemplary embodiment of the present invention, one of the mold segments comprises a mold core that is movably mounted on one of the other mold segments. The mold core is movable on the other mold segment between an extended position adjacent to the tube when the mold is closed, and a retracted position spaced from the tube. The blow pin may be mounted, either fixedly or movably, on the mold core or one of the other mold segments. In the exemplary preferred embodiment of the invention, the blow pin is movably mounted on the mold core for movement between an extended position that pierces the wall of the tube when the mold core is extended, and a retracted position spaced from the wall of the tube. Provision of a mold core movably mounted on another segment allows molding of plastic containers having contours, features and geometries that have not been blow-moldable to date, including containers having deep undercuts, containers having elaborate cross sections such as star-shaped cross sections, and containers with recesses along the mold parting line for storing devices such as trigger sprayers for the home/garden industry, for example.

A mold system for blow molding hollow plastic containers in accordance with an exemplary presently preferred embodiment of the invention includes an extruder for providing a hollow tube of plastic material having a longitudinal axis. The extruded tube may be of monolayer construction, or may be of multilayer construction including various layers of plastic resin material and/or adhesive material for obtaining desired properties in the container. A plurality of at least three mold segments include at least two mold segments that are movable against a third mold segment, in directions perpendicular to the tube axis, between a closed position in which the mold segments form a hollow mold cavity in which the tube is captured and an open position spaced from the tube axis. A blow pin is disposed on one of the mold segments to pierce the tube in the closed positions of the mold segments. One of the mold segments preferably comprises a mold core movably mounted on a second of the mold segments, and cylinders are mounted on the second mold segment for moving the mold core between an extended position and a retracted position with respect to the second mold segment. The blow pin preferably is movably mounted on the mold core.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
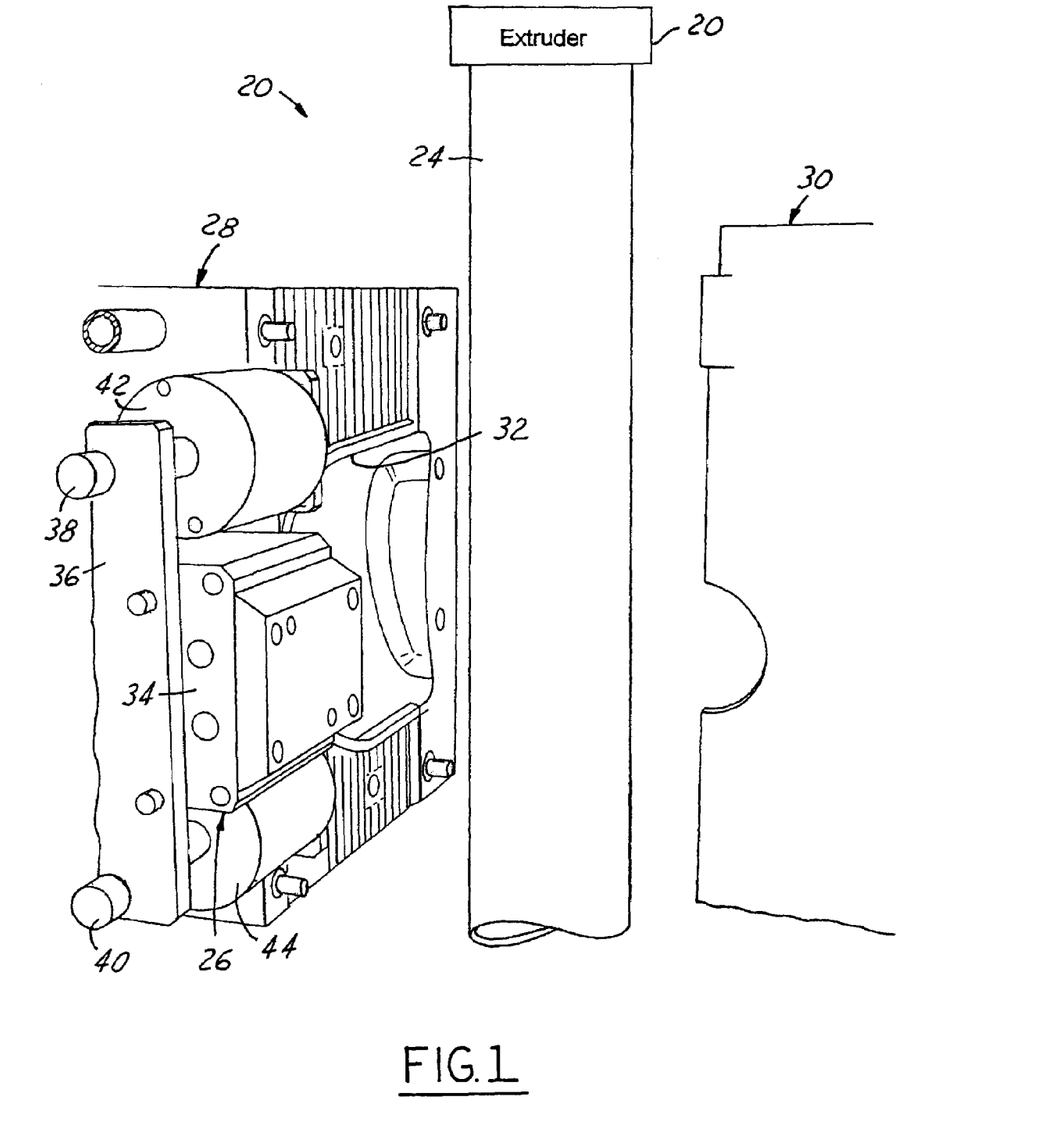
FIG. 1 is an end perspective view of a mold system in accordance with one exemplary but presently preferred embodiment of the invention.

FIG. 1 illustrates a mold system 20 in accordance with one presently preferred embodiment of the invention as comprising an extruder 22 for extruding a hollow continuous tube 24 of plastic material. As noted above, tube 24 may comprise a monolayer tube, or may comprise a multilayer tube that includes barrier resin layers, adhesive layers, regrind layers, post consumer resin layers, etc. for obtaining desired characteristics in the final container. Tube 24 is typically, but not necessarily, of cylindrical geometry, and is typically, but not necessarily, of uniform wall thickness throughout its length and circumference. A first mold segment 26, a second mold segment 28 and a third mold segment 30 are mounted adjacent to the path of tube 24. At least two of the mold segments—e.g., segments 26 and 30—are movable with respect to each other with respect to mold segment 28 and with respect to the axis of tube 24 between an open position illustrated in FIG. 1 that permits passage of tube 24 between the mold segments, and a closed position in which the mold segments cooperate to form a closed mold cavity 32 (FIGS. 3A and 3B) for blow-molding a container.

In the preferred but exemplary embodiment of the invention illustrated in FIGS. 1–8, drawings, first mold segment 26 comprises a mold core that is movably mounted on second mold segment 28. Mold core segment 26 includes a mold core block 34 (FIGS. 1–3A and 4) supported by a bridge plate 36 between the piston rods 38, 40 of a pair of pneumatic cylinders 42, 44. Pneumatic cylinders 42, 44 are mounted on an end surface of mold segment 28. Core block 34 includes an opening that is closed by a cylinder cap 48 (FIG. 3A) to form a hollow cylinder cavity 46. A piston assembly 50 includes a piston body 52 slidable within cavity 46. A hollow blow needle or pin 54 extends from piston body 52 through a passage 56 in core block 34. Blow pin 54 has a sharpened end for piercing the wall of the extruded tube, as will be described. A guide pin 58 also extends from piston body 52, and is received in an opening 60 in core block 34 for maintaining the desired orientation of piston body 52 and blow pin 54. Piston body 52 has annular seals for sealing engagement with the opposing internal surface of cylinder cavity 46. Likewise, cylinder cap 48 has seals for engaging the opposing surface of core block 34 to seal the internal cylinder cavity. A pair of air passages 61, 62 extend from the outer surface of core block 36 to the opposite ends of cavity 46. (Directional words such as "inner" and "outer" are taken with respect to the mold cavity formed by the mold segments.)

Figure 3A:
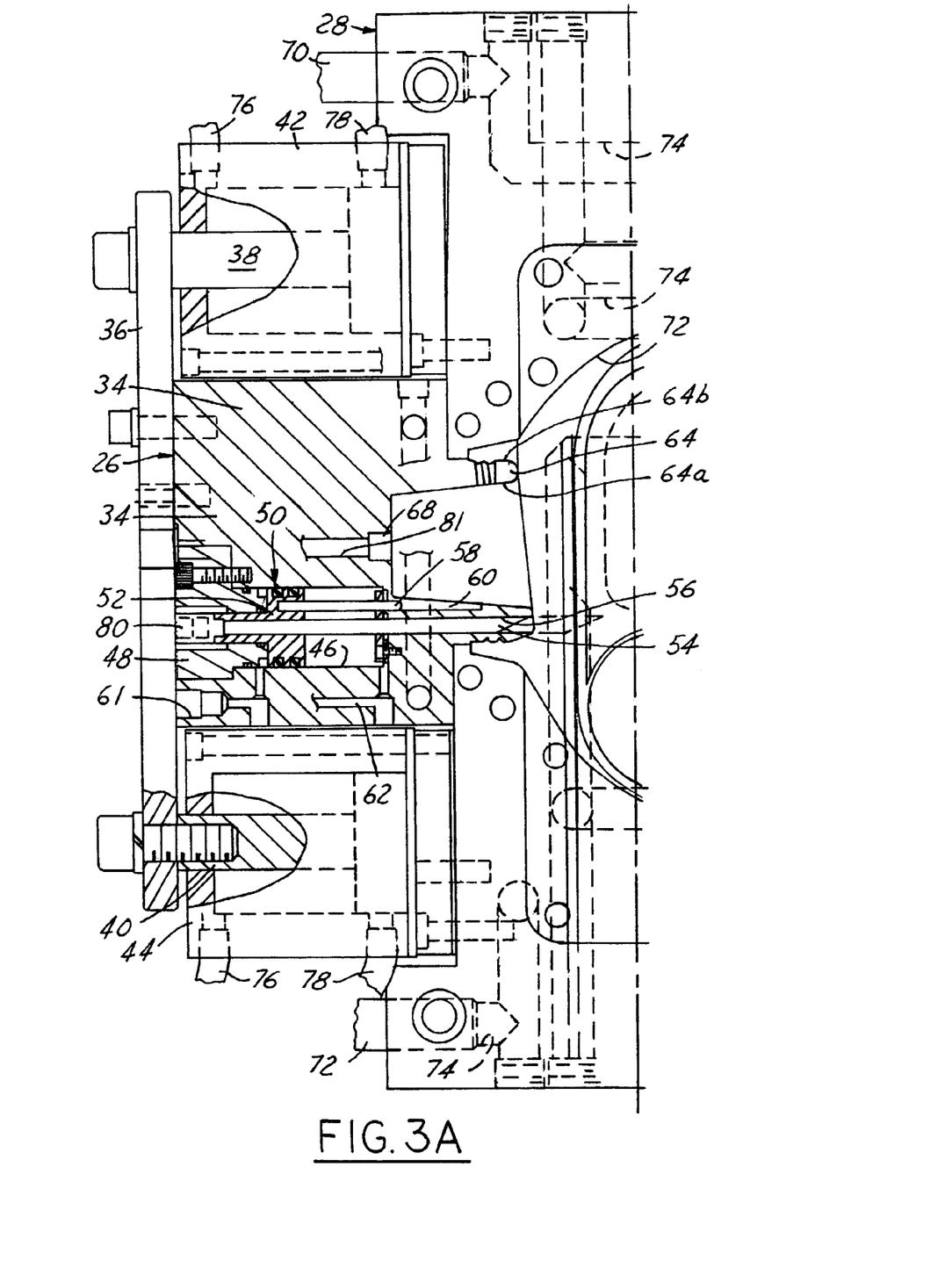
FIGS. 3A and 3B together comprise a side elevational view of the mold segments illustrated in FIG. 2.
Figure 4:
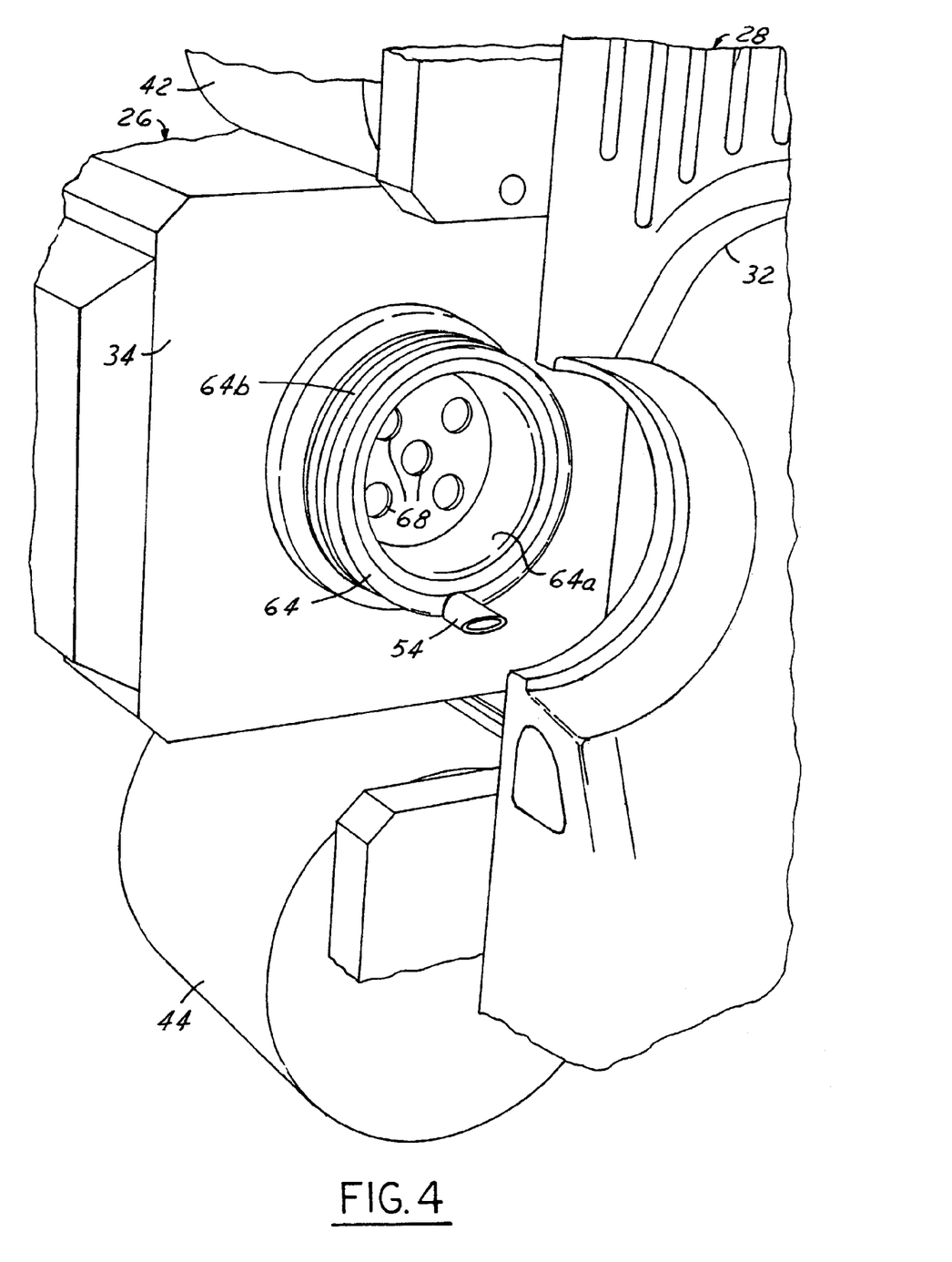
FIG. 4 is a fragmentary perspective view of the mold core and blow pin arrangement in FIG. 3A.
Figure 5:
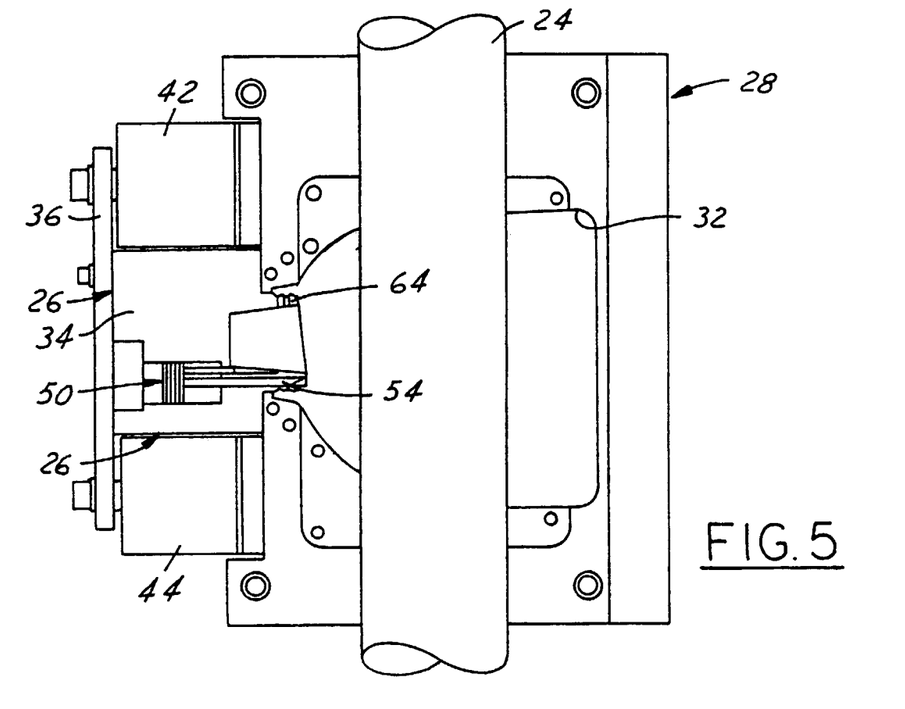
FIGS. 5–8 are schematic drawings that illustrate sequential stages of operation of the mold system in accordance with the embodiment of FIGS. 1–4.
Figure 6:
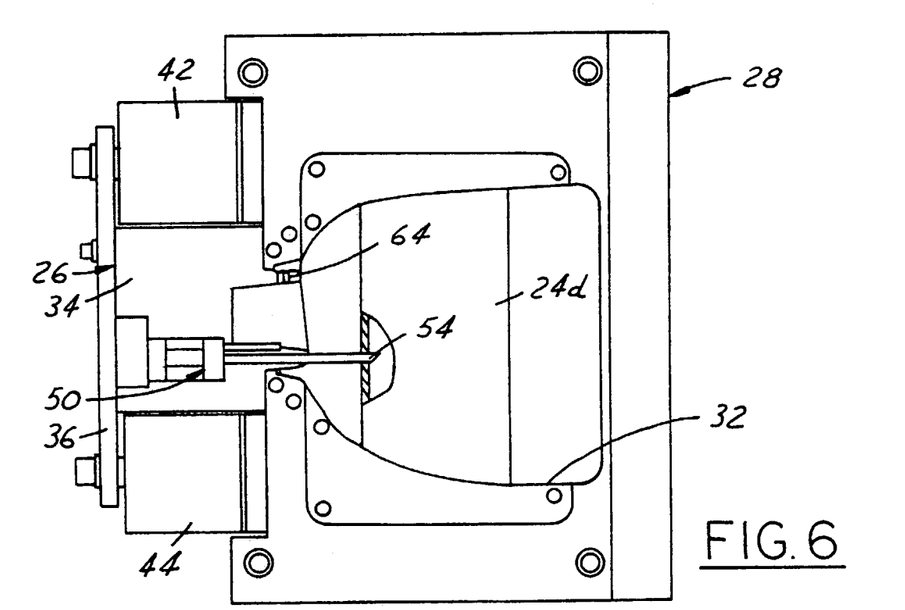

Core block 34 in the illustrated embodiment of the invention has an annular collar 64 (FIGS. 3A and 4–8) that extends into mold cavity 32 in the fully extended position of core block 34 illustrated in FIGS. 3A and 5–7. In the fully retracted position of core block 34 (FIG. 8), collar 64 clears mold cavity 72 to permit removal of the container. Collar 64 is generally cylindrical in geometry, and has an inner end disposed in a plane at an angle to the axis of the collar for molding a drainback ledge on the container finish, as will be described. Mold core collar 64 is selectively movable by cylinders 42, 44 into and out of an opening 66 formed by opposed mold segments 28, 30 between the fully extended position illustrated in FIGS. 3A and 4–7, and the fully retracted position illustrated in FIG. 8. Mold core collar 64 has a radially inwardly facing conical surface 64a for forming the container spout, and a radially outwardly facing substantially cylindrical surface 64b with grooves for forming internal threads on the container collar. Blow pin passage 56 opens at the maximum height of collar 64, which will be the low point of the drainage channel in the formed container. As best seen in FIGS. 3A and 4, there are a plurality of openings 68 on the internal axial face of mold core 34 within collar 64 for venting air from or drawing a vacuum in the mold cavity during blowing of the container.

Figure 2:
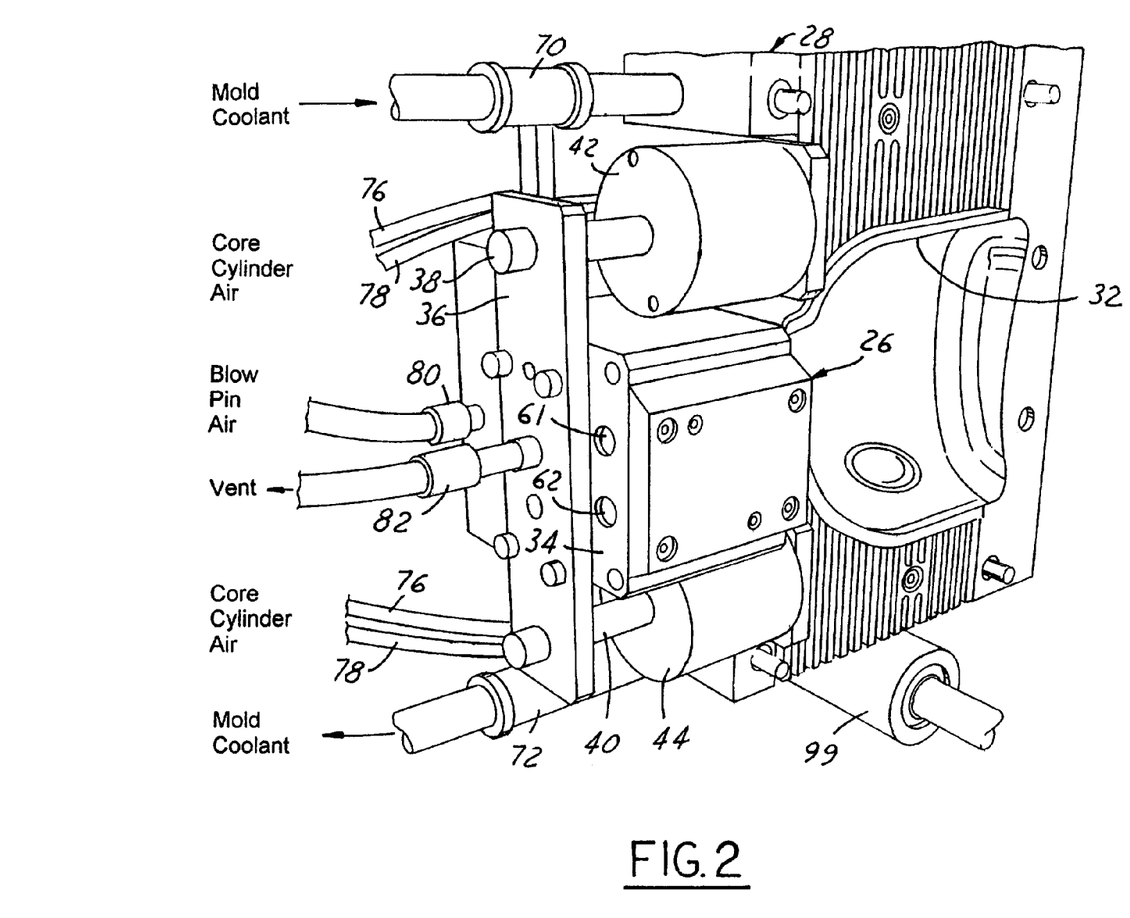
FIG. 2 is a perspective elevational view of two of the mold segments in the system of FIG. 1.
Figure 3B:
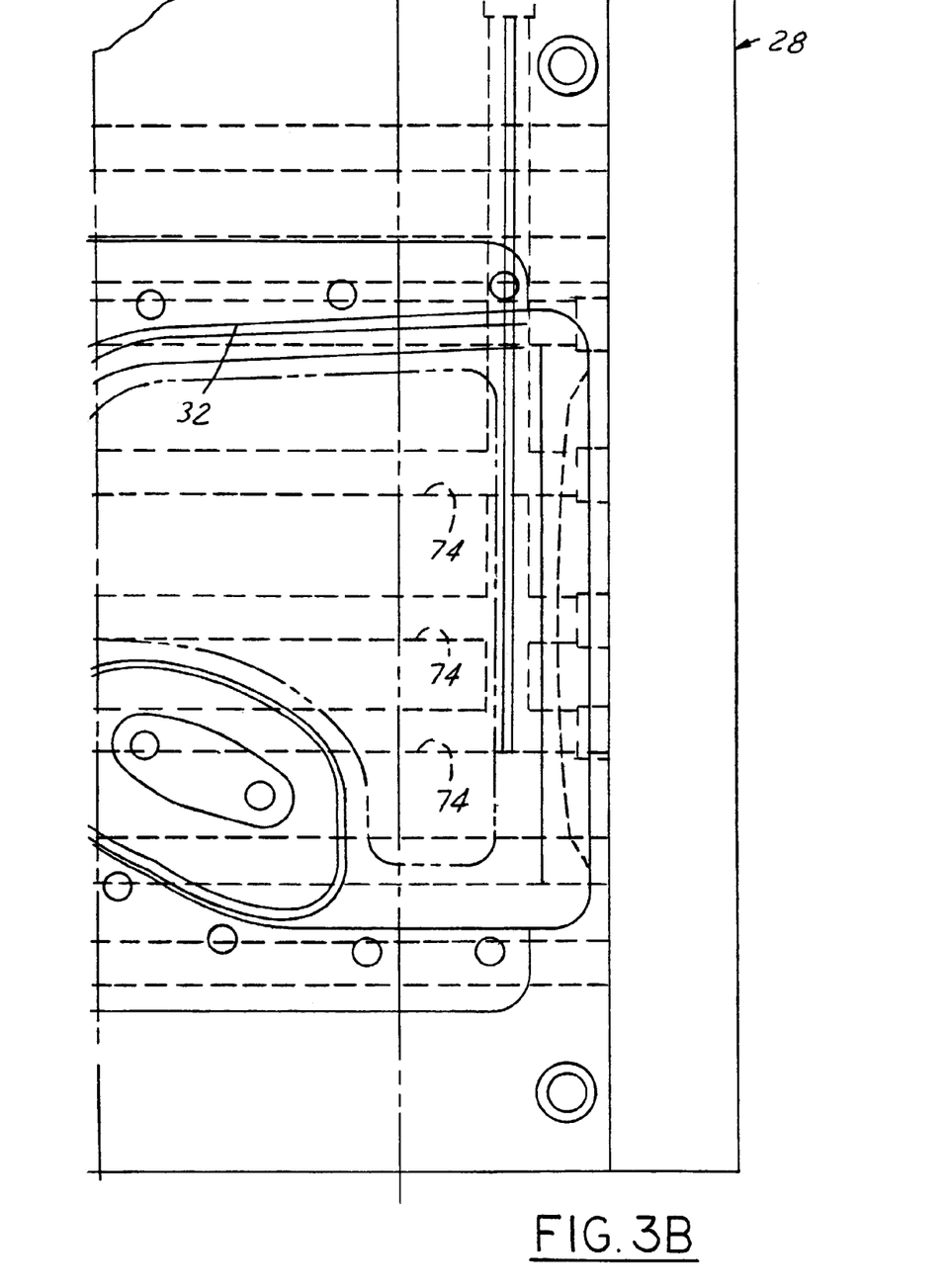

FIGS. 2 and 3A illustrate fluid inlet and outlet to mold segments 26, 28. Mold coolant is fed to mold segment 28 (and mold segment 30 in FIG. 1) through an inlet 70, an outlet 72 and mold coolant passages 74 (FIGS. 3A and 3B). Each pneumatic cylinder 42, 44 receives drive air through an associated pair of lines 76, 78. Cylinders 42, 44 operate in unison, as will be described. Blow pin air is fed through a fitting 80 (FIGS. 2 and 3A) mounted on piston 52, and through the hollow interior of the blow pin into the mold cavity. Vent air is fed from the mold cavity through openings 68 (FIGS. 3A and 4,) through passages 81 in core block 34 (FIG. 3A), and thence through a vent outlet fitting 82 (FIG. 2). Blow pin cylinder cavity 46 receives air through passages 61, 62 (FIG. 3A), as previously described, for moving the blow pin assembly, which includes blow pin piston 52, blow pin 54, guide pin 58 and fitting 80, between the fully retracted position illustrated in FIGS. 3A, 5 and 8, and the fully extended position illustrated in FIGS. 4 and 6–7. The mold coolant may be of any suitable type. Cylinders 42, 44 preferably are pneumatic, but could be hydraulic or electric. Likewise, blow pin piston/cylinder 52, 46 preferably is pneumatic, but could be hydraulic or electric. The container preferably is blow molded by air at elevated pressure, although other gases could be employed to obtain particular internal surface characteristics in the molded container.

Figure 7:
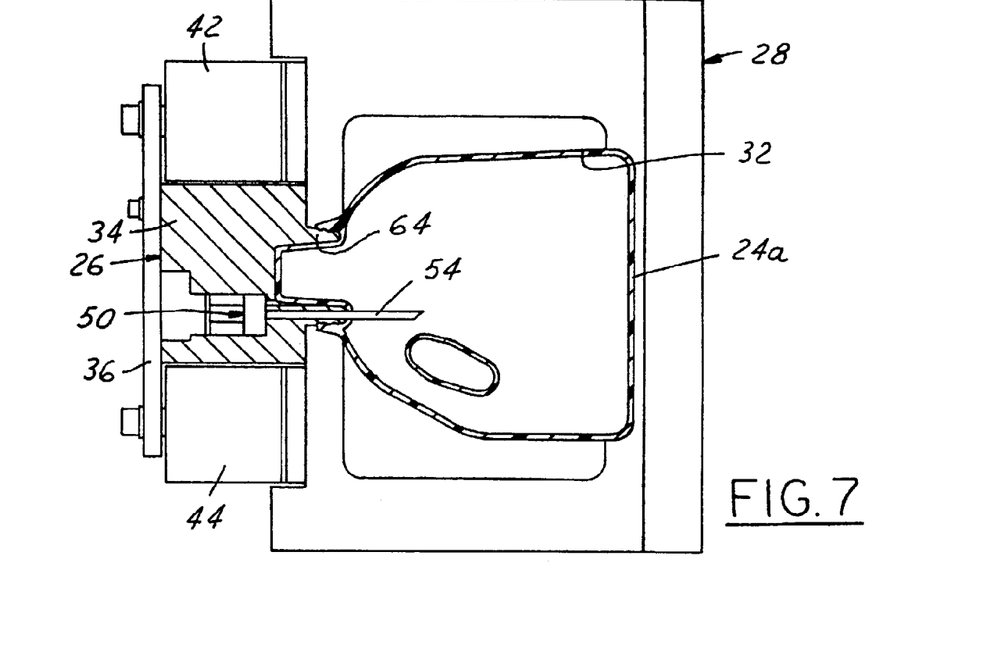

The sequence of operation of mold system 20 is illustrated schematically in FIGS. 5–8. (The movement of mold segment 30 is generally conventional in and of itself, and is not shown in FIGS. 5–8 to facilitate illustration.) In the starting position of FIG. 5, mold core 34 is extended within mold section 26 to a position adjacent to tube 24. In this position of mold core 34, mold section 30 (FIG. 1) is moved into the page in FIG. 5 to capture a portion 24d (FIG. 6) of tube 24 within mold cavity 32. Air is then applied to the blow pin cylinder to move blow pin 54 from the retracted position of FIG. 5 to the extended position of FIG. 6, in which blow pin 54 pierces the wall of tube 24. Blow air is then fed through pin 54 into the portion 24d of tube 24 captured between the mold segments to expand the captured portion of tube 24 and blow mold the tube to the internal confines of mold cavity 32. The blow-molded container 24a so formed is illustrated in FIG. 7. The air from cavity 32 that is displaced by expansion of the tube is vented through vent openings 68

Figure 8:
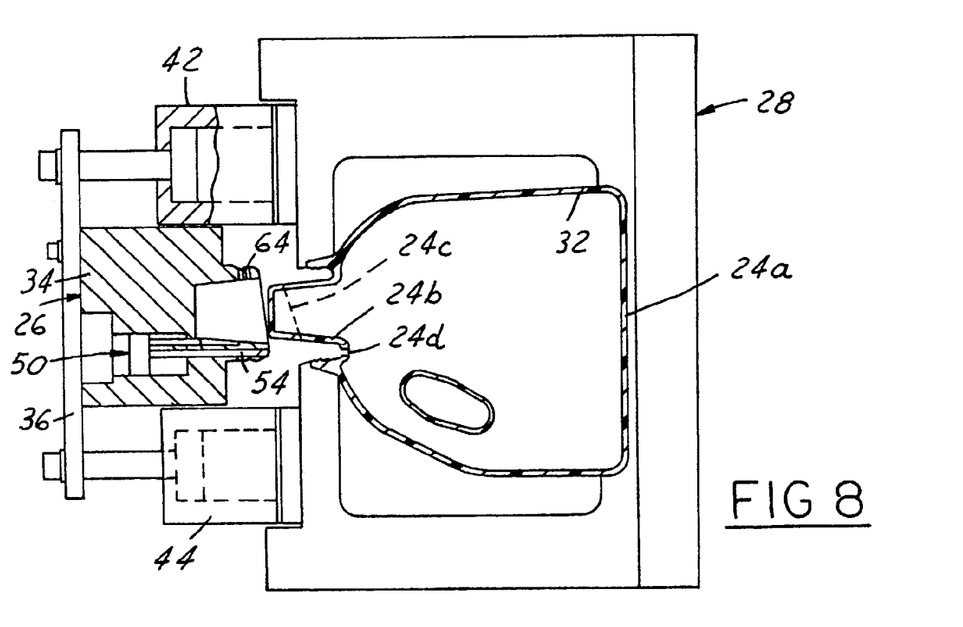

(FIGS. 3A and 4), passages 81 (FIG. 3A) and vent outlet fitting 82 (FIG. 2). At this point, core block 34 may be moved by cylinders 42, 44 to the retracted position illustrated in FIG. 8, and blow pin 34 may be moved to the retracted position with respect to the core block as illustrated in FIG. 8 to leave a drainback opening 24d. Mold segment 30 is likewise moved to a retracted position spaced from mold segment 28 as illustrated in FIG. 1, such as by operation of cylinders 99 (FIG. 2). Container body 24a can then be removed from between the mold segments. In a subsequent operation, the dome 24b of container body 24a, which is molded within collar 64 on mold core 34, is sliced as along the line 24c to form a container pour spout. The container is then ready for use as a drainback-type container of the type illustrated in above-noted U.S. Pat. No. 5,207, 356, etc. The angulated end of core block collar 64 forms an angulated surface beneath the spout for capturing any liquid that may drip from the end of the spout during use. This liquid is returned to the internal volume of the container through an opening at the low point of this drainback surface, which opening has been formed by blow pin 54.

Figure 11:
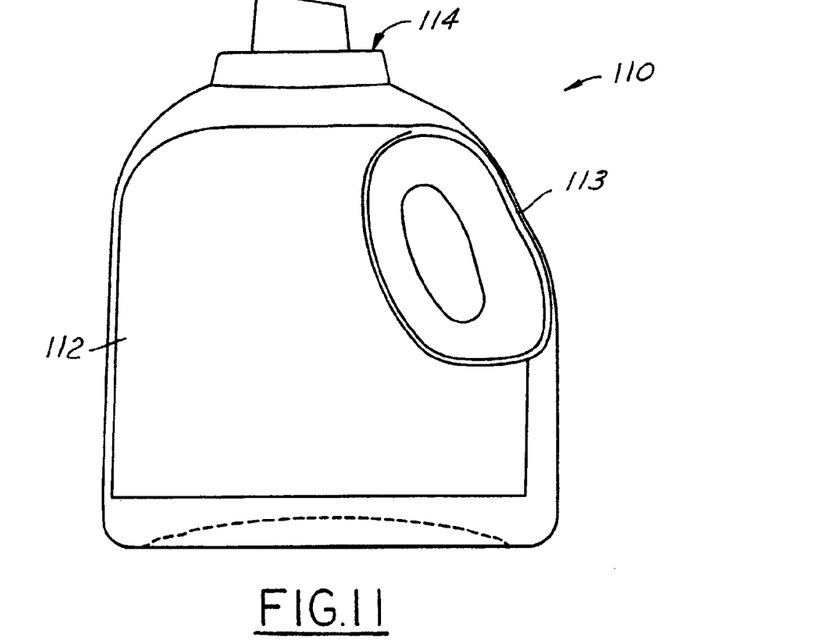
FIG. 11 is an elevational view of an exemplary container fabricated in accordance with FIGS. 1–8.
Figure 12:
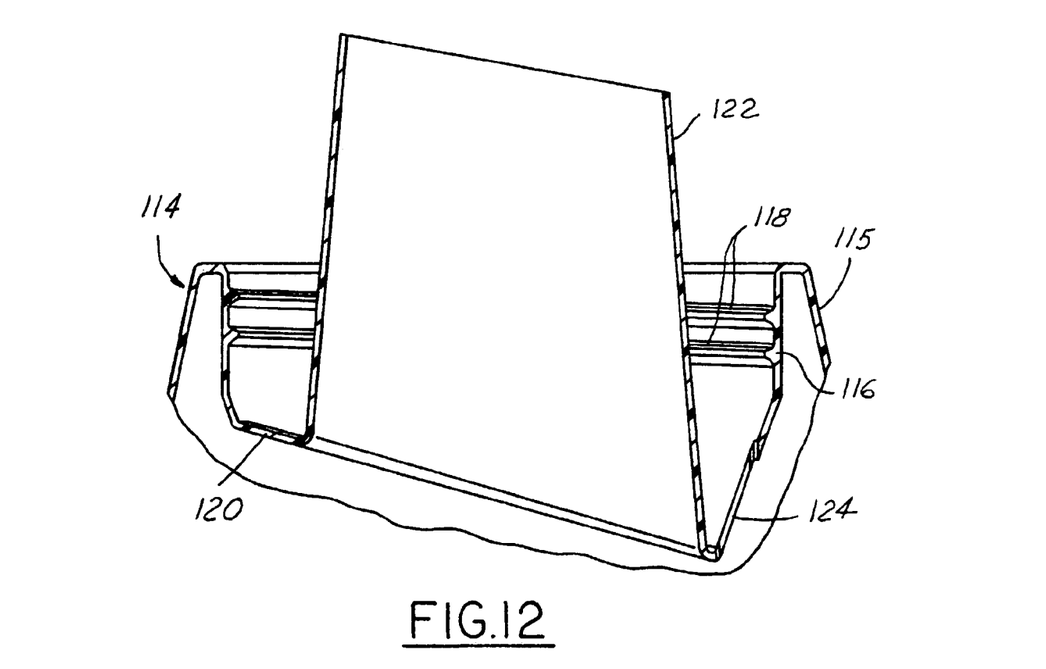
FIG. 12 is an enlarged sectional view of a portion of the container in FIG. 11.

FIGS. 11 and 12 illustrate a container 110 as molded in accordance with the 20 method and system of FIGS. 1–8 and trimmed along plane 24c (FIG. 8). Container 110 includes a hollow body 112 with a handle 113 and an integrally blow molded finish 114. The finish has an annular exterior portion 115 forming an axial extension of body 112. An annular reentry portion 116 extends within exterior portion 115, and has one or more internal threads 118 for receiving a closure. An annular ledge portion 120 extends radially inwardly from an end of reentry portion 116. An annular spout portion 122 extends axially outwardly from ledge portion 120. Ledge portion 120 is at an angle to the axis of spout portion 122, and the drainback opening 124 formed by blow pin 54 (FIGS. 3A and 7) is at the low point of the ledge portion. Thus, the bottle is essentially completed as molded, only requiring trimming along plane 24c (FIG. 8).

Figure 9:
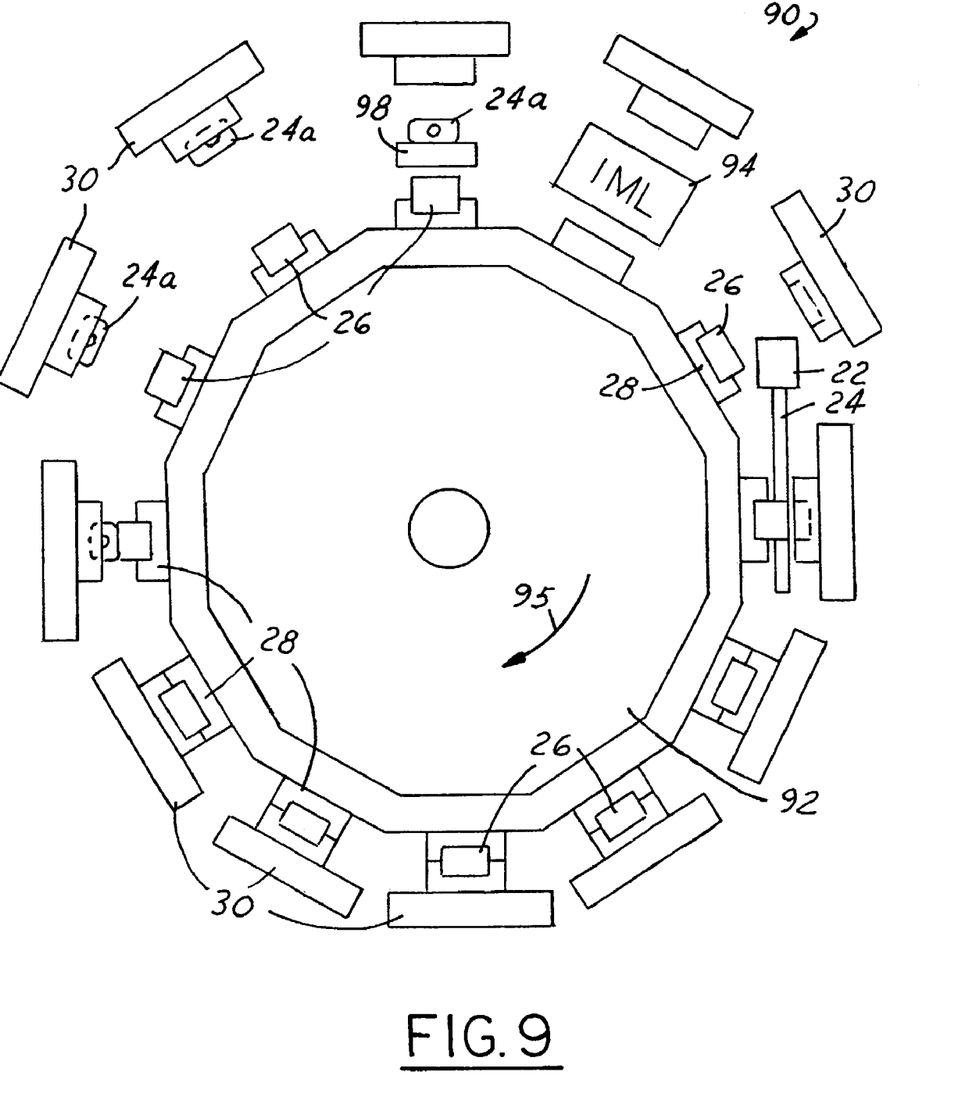
FIG. 9 is a schematic diagram of a continuous extrusion wheel-type machine in which the illustrated exemplary embodiment of the invention may be implemented.

FIG. 9 illustrates a preferred implementation of the exemplary embodiment of the invention in a continuous extrusion wheel-type molding machine 90. A plurality of mold segments 28 are mounted in fixed position around the periphery of a wheel 92. Each mold segment 28 carries an associated mold core segment 26. A plurality of mold segments 30 are movable with respect to their associated fixed mold segments 28 radially inwardly and outwardly with respect to the axis of rotation of wheel 92, such as by operation of cylinders 99 (FIG. 2). Extruder 22 provides tube 24 of plastic material between mold segments 28, 30 at the three o'clock position of machine 90. Mold segment 30 is then closed against mold segment 28 as the wheel continues rotation, blow air is applied to the mold cavity, and the molded container body is allowed to cool as the wheel rotates the mold pair in the direction 95 to about the nine o'clock position. At the nine o' clock position, the mold segments open, mold core segment 26 having already been retracted, and the container can be removed onto a conveyor 98 for further processing. The machine 90 in FIG. 9 also includes an in-mold labeling mechanism 94 for placing labels into mold segment 28 and/or 30 for securement to the container when the container is subsequently molded against the internal confines of the mold cavity.

Figure 10:
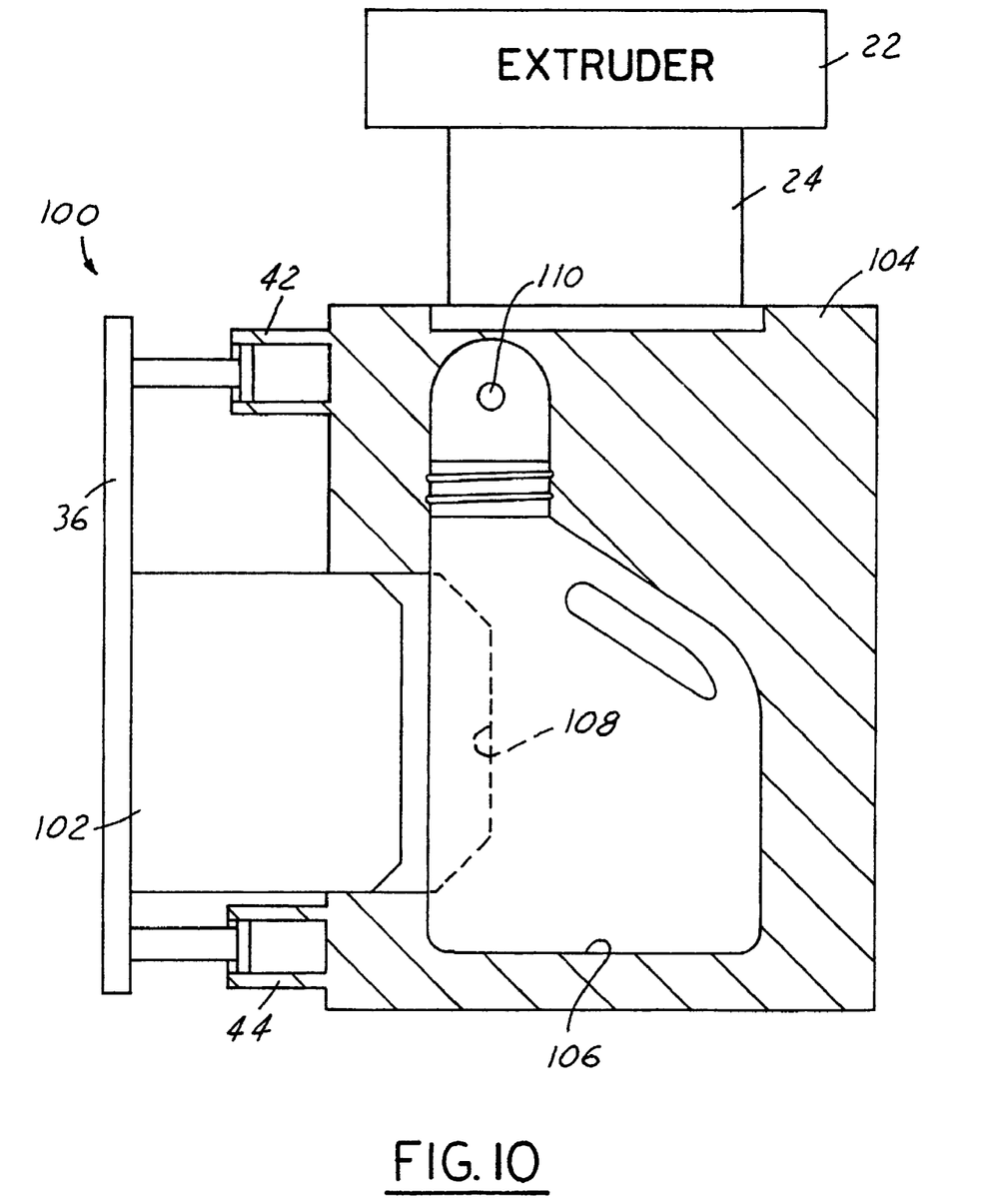
FIG. 10 is a fragmentary schematic drawing that illustrates a second exemplary implementation of the invention.
Figure 13:
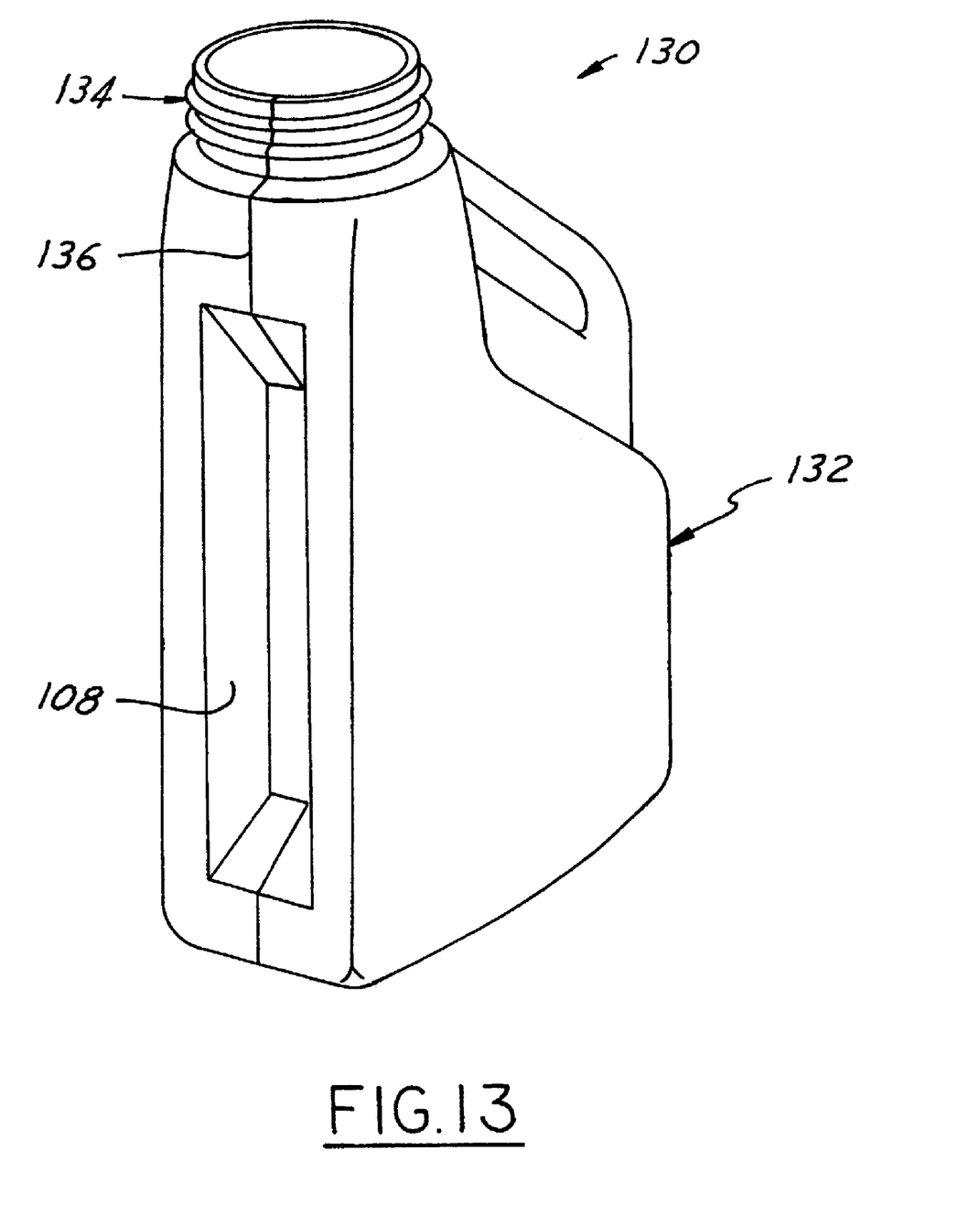
FIG. 13 is a perspective view of a container made with the mold system of FIG. 10.

In the preferred but exemplary embodiment of the invention illustrated in FIGS. 1–8, the central axis of the mold cavity is parallel to the outlet axis of the final container as formed, and is perpendicular to the axis of the extruded tube. However, the present invention in its broadest aspects is by no means limited to these or other details of the preferred embodiment of FIGS. 1–8. For example, FIG. 10 illustrates a modified mold system 100, in which reference numerals identical to those in FIGS. 1–8 illustrate identical or similar components. In FIG. 10, a mold core 102 is mounted on a mold segment 104 by means of cylinders 42, 44 and plate 36. Mold segment 104 and an opposing mold segment (not shown to facilitate illustration but similar to mold segment 30 in FIG. 1) form a mold cavity 106. As in FIGS. 1–8, the axis of cavity 106 is parallel to the axis of the outlet portion of the final container. However, in FIG. 10, the axis of cavity 106 is also parallel to the axis of extruded tube 24, rather than perpendicular to the axis of the tube as in FIGS. 1–8. Mold core 102 is extendable into cavity 106 to form a pocket 108 in the side of the container for storage of a trigger spray head, for example, for home and garden applications (e.g., weed killer). FIG. 13 illustrates an exemplary container 130 molded with the system of FIG. 10. The container body 132 and finish 134 have a mold parting line 136. Pocket 108 is formed in a container sidewall on this parting line.

System 100 of FIG. 10 also illustrates a modification in which a blow needle or pin 110 is mounted on mold segment 104 rather than on mold core 102. Blow pin 110 extends into a portion of cavity 106 that will form a moil on the outlet portion of the container, which will be removed in a post-mold trimming operation. Blow pin 110 may be either stationarily or movably mounted on mold segment 104. When the blow pin is stationarily mounted on the mold segment, a vacuum aperture may be disposed around or adjacent to the blow pin, as disclosed for example in U.S. Pat. Nos. 5,851,479 and 6,048,192, to draw the material of the tube over the blow pin. It should be noted in connection with FIG. 10 that a second mold core, of the same or differing configuration as compared with mold core 102, could be mounted on the opposite side of mold segment 104.

Figure 14:
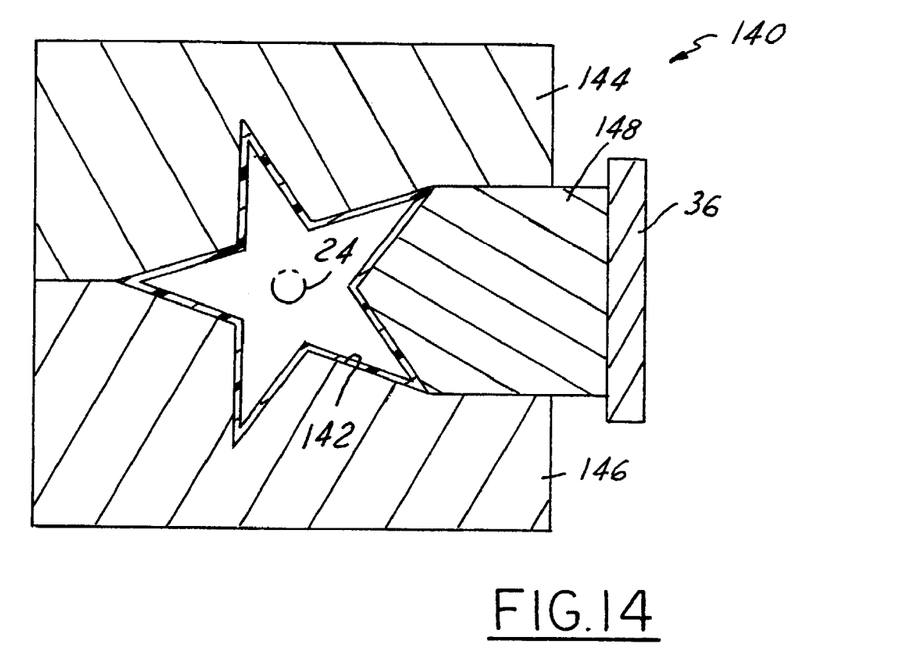
FIG. 14 is a fragmentary sectional view that illustrates a third exemplary implementation of the invention.
Figure 15:
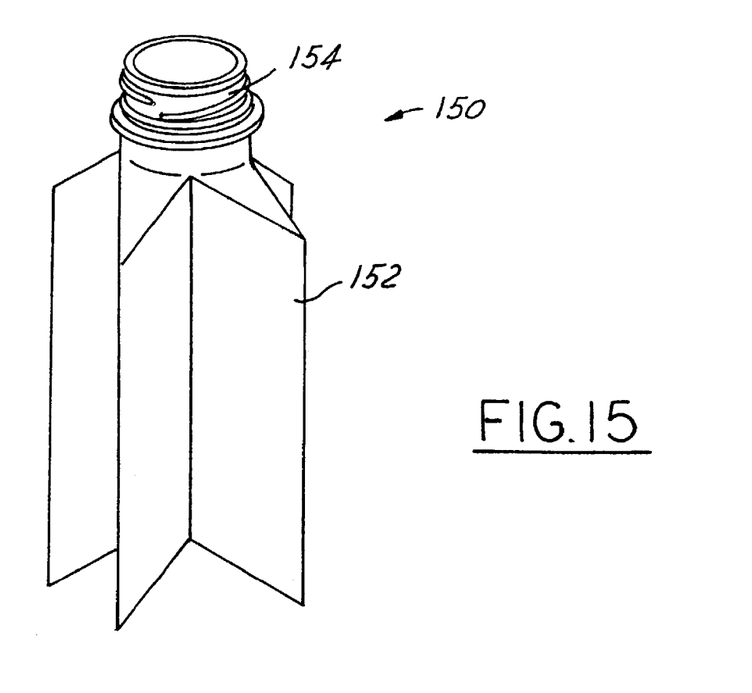
FIG. 15 is a perspective view of a star-shaped container molded in the apparatus of FIG. 14.

FIG. 14 illustrates a second modified mold system 140 in which the axis of the mold cavity 142 is parallel to, rather than perpendicular to, the axis of extruded tube 24. Apparatus 140 includes a pair of mold segments 144, 146 and a mold core 148 carried by plate 36 that is movably mounted on mold segment 144 (or 146). Mold segments 144, 146 and mold core 148 cooperate to define a five-pointed star-shaped mold cavity 142. A six-pointed star-shaped mold cavity may require a second mold segment core 148 on mold segment 144 (or 146). FIG. 15 illustrates a container 150, having a star-shaped body 152 and a finish 154, fabricated using mold system 140. The present invention thus enables molding of complex or oddly shaped container contours, such as star-shaped containers, that were not heretofore readily moldable in the art.

There have thus been disclosed a method and apparatus that fully satisfy all of the objects and aims previously set forth. Although the invention has been disclosed in detail primarily in conjunction with manufacture of self-draining containers of the type currently employed for household laundry applications, the invention is by no means limited to this specific implementation. Use of one or more mold core segments movably mounted on one of the other mold segments makes possible manufacture of containers with cross sections not previously attempted in blow-molding operations. The invention is intended to embrace all modifications and variations as fall within the spirit and broad scope of the appended claims.

The invention claimed is:

1. A mold system for blow molding hollow plastic containers, which includes:
   an extruder for providing a hollow tube of plastic material having a longitudinal axis, a plurality of at least three mold segments, at least two of which are movable against a third mold segment, in directions perpendicular to said axis, between a closed position in which said mold segments form a hollow mold cavity in which the tube is captured and an open position spaced from said axis, and a blow pin on one of said mold segments to pierce the tube in the closed position of said mold segments, wherein at least one of said mold segments comprises a mold core movably mounted on a second of said mold segments, and wherein said system further includes a means for moving said at least one mold core between an extended position and a retracted position with respect to said second mold segment, said means comprising a pair of cylinders on said second mold segment on opposite sides of said mold core, and a bridge plate extending between said cylinders, said mold core being operatively coupled to said bridge plate on said second mold segment.

2. The system set forth in claim 1 wherein said blow pin is movably mounted on said one mold segment.

3. The system set forth in claim 2 wherein said blow pin includes a cylinder on said one mold segment, a piston movable within said cylinder, said blow pin being mounted on said piston, and passages in said one mold segment for feeding fluid to said cylinder to extend and retract said blow pin with respect to said one mold segment.

4. The system set forth in claim 1 wherein said blow pin is stationarily mounted on said one mold segment.

5. The system set forth in claim 1 wherein said blow pin is mounted on said mold core.

6. The system set forth in claim 5 wherein said blow pin includes a cylinder on said mold core, a piston movable within said cylinder, said blow pin being mounted on said piston, and passages in said mold core for feeding fluid to said cylinder to extend and retract said blow pin with respect to said mold core.

7. A mold system for blow molding hollow plastic containers, which includes:

a first mold segment, a second mold segment movable with respect to the first mold segment between a closed position against said first mold segment forming a mold cavity and an open position spaced from said first mold segment, a third mold segment comprising a mold core mounted on said first mold segment for movement between an extended position extending into said mold cavity and a retracted position withdrawn from said mold cavity, an extruder for extruding a hollow tube of plastic material between said first and second mold segments in said open position of said mold segments, and a blow pin on one of said mold segments for piercing the extruded tube and blowing the tube to the confines of said mold cavity formed by said first and second mold segments in said closed position and said mold core in said extended position, wherein the blow pin forms a blow pin hole when the blow pin pierces the extruded tube, and the blow pin hole forms a drainback opening in the container.

8. The system set forth in claim 7 wherein said blow pin is stationarily mounted on one of said mold segments.

9. The system set forth in claim 7 wherein said blow pin is movably mounted on one of said mold segments.

10. The system set forth in claim 9 wherein said blow pin is movable on said mold core between a retracted position and an extended position in which said pin pierces the tube.

11. The system set forth in claim 9 wherein said mold core is mounted on said first mold segment for movement in a direction perpendicular to an axis of said tube.

12. A mold system for molding a hollow plastic container having an outlet portion and an axis through the outlet portion, comprising:

a mold having mold segments that form a mold cavity having a portion for forming the outlet portion of the container and a mold axis parallel to the axis of the outlet portion of the container, an extruder for extruding between said mold segments a tube of plastic material having a longitudinal axis perpendicular to said mold axis, means for closing said mold segments to capture said extruded tube between said mold segments, a blow pin on one of said mold segments and extendable into said cavity through said outlet-forming portion of said cavity, means for blowing said captured extended tube through said blow pin to the confines of said cavity, at least one mold core on one of said mold segments and on which said blow pin is movably mounted, said mold core being extendable and retractable in a direction parallel said axis of said mold cavity, and means for extending said mold core into said cavity to form the outlet portion in the container, and retracting said mold core and said blow pin from said cavity to release the outlet portion in the container as molded.

13. The system set forth in claim 12 wherein said means comprise at least one cylinder mounted on said second mold segment and operatively coupled to said mold core.

14. The system set forth in claim 13 wherein said blow pin is mounted on said mold core.

* * * * *